United States Patent
Sannomiya et al.

(10) Patent No.: US 10,268,176 B2
(45) Date of Patent: *Apr. 23, 2019

(54) CONTROL DEVICE FOR MACHINE TOOL AND MACHINE TOOL INCLUDING THE CONTROL DEVICE

(71) Applicants: Citizen Watch, Co, Ltd., Tokyo (JP); Citizen Machinery Co., Ltd., Nagano (JP)

(72) Inventors: Kazuhiko Sannomiya, Nagano (JP); Hitoshi Matsumoto, Nagano (JP); Takanori Shinohara, Nagano (JP); Hiroshi Shinohara, Nagano (JP); Toshinari Oyama, Tokyo (JP); Nobuyoshi Imasaki, Hyogo (JP)

(73) Assignees: Citizen Watch Co., Ltd., Tokyo (JP); Citizen Machinery Co., Ltd., Nagano (JP)

( * ) Notice: Subject to any disclaimer, the term of this patent is extended or adjusted under 35 U.S.C. 154(b) by 182 days.

This patent is subject to a terminal disclaimer.

(21) Appl. No.: 15/129,238

(22) PCT Filed: Mar. 24, 2015

(86) PCT No.: PCT/JP2015/058825
§ 371 (c)(1),
(2) Date: Sep. 26, 2016

(87) PCT Pub. No.: WO2015/146945
PCT Pub. Date: Oct. 1, 2015

(65) Prior Publication Data
US 2017/0108846 A1 Apr. 20, 2017

(30) Foreign Application Priority Data

| Mar. 26, 2014 | (JP) | 2014-063603 |
| Mar. 26, 2014 | (JP) | 2014-063604 |
| Sep. 22, 2014 | (JP) | 2014-192949 |

(51) Int. Cl.
*B23B 1/00* (2006.01)
*B23B 25/02* (2006.01)
(Continued)

(52) U.S. Cl.
CPC .............. *G05B 19/19* (2013.01); *B23B 25/02* (2013.01); *B23B 29/125* (2013.01);
(Continued)

(58) Field of Classification Search
None
See application file for complete search history.

(56) References Cited

U.S. PATENT DOCUMENTS

| 5,572,430 A | 11/1996 | Akasaka et al. |
| 5,911,802 A | 6/1999 | Kimura et al. |

(Continued)

FOREIGN PATENT DOCUMENTS

| JP | H2270001 A | 11/1990 |
| JP | 2002 001568 A | 1/2002 |
| JP | 5139591 B1 | 2/2013 |

OTHER PUBLICATIONS

Kitakaze et al., U.S. Appl. No. 15/129,242, filed Sep. 26, 2016 on Control Device for Machine Tool and Machine Tool Including the Control Device.

*Primary Examiner* — Qing Yuan Wu
(74) *Attorney, Agent, or Firm* — Howson & Howson LLP

(57) ABSTRACT

To provide a machine tool and a control device for the machine tool that can smoothly cut a workpiece while segmenting chips by feeding a cutting tool in a feed direction while reciprocally vibrating the cutting tool along the feed direction on the basis of a condition set by a user. The machine tool (100) or the control device (C) includes the
(Continued)

control section (C1) that determines a number of rotations of the relative rotation and a number of vibrations of the reciprocal vibration per rotation of the relative rotation when the workpiece (W) is machined in accordance with a vibration frequency dependent on a period in which an operating instruction can be executed.

17 Claims, 10 Drawing Sheets

(51) Int. Cl.
    *B23B 29/12*     (2006.01)
    *B23Q 17/10*     (2006.01)
    *B23Q 17/12*     (2006.01)
    *G05B 19/18*     (2006.01)
    *G05B 19/19*     (2006.01)
    *B23Q 15/007*     (2006.01)

(52) U.S. Cl.
    CPC ......... *B23Q 15/0075* (2013.01); *B23Q 17/10* (2013.01); *B23Q 17/12* (2013.01); *G05B 19/18* (2013.01); *B23B 1/00* (2013.01); *B23C 2250/16* (2013.01); *G05B 2219/49053* (2013.01); *G05B 2219/49055* (2013.01); *G05B 2219/49277* (2013.01); *G05B 2219/49382* (2013.01)

(56) References Cited

U.S. PATENT DOCUMENTS

| | | |
|---|---|---|
| 9,975,211 B2 * | 5/2018 | Hariki ..................... B23Q 1/34 |
| 2009/0107308 A1 | 4/2009 | Woody et al. |
| 2014/0102268 A1 | 4/2014 | Hariki et al. |

\* cited by examiner

FIG.5

| INSTRUCTION PERIOD (s) | VIBRATION FREQUENCY f (Hz) |
|---|---|
| 0.004 × 4 | 62.5 |
| 0.004 × 5 | 50 |
| 0.004 × 6 | 41.666 |
| 0.004 × 7 | 35.714 |
| 0.004 × 8 | 31.25 |
| ⋮ | ⋮ |

FIG.7

TABLE OF VALUES OF NUMBER OF ROTATIONS S (r/min) OF SPINDLE CORRESPONDING
TO VALUES OF NUMBER OF VIBRATIONS N AND VALUES OF VIBRATION FREQUENCY f

|  |  | VIBRATION FREQUENCY f (Hz) | | | |
| --- | --- | --- | --- | --- | --- |
|  |  | 62.5 | 50 | 41.666 | ... |
| NUMBER OF VIBRATIONS PER ROTATION OF SPINDLE | 3.5 | 1071.429 | 857.1429 | 714.2743 | ... |
|  | 2.5 | 1500 | 1200 | 999.984 | ... |
|  | 1.5 | 2500 | 2000 | 1666.64 | ... |
|  | 0.5 | 7500 | 6000 | 4999.92 | ... |

FIG.9

EXAMPLE OF MACHINING PROGRAM

G△△△ P1 Q1.5 D3.5    START VIBRATION CUTTING

G1 X7.50 Z-2.5 F0.015    TAPER CUTTING

G△△△ P0    END VIBRATION CUTTING

CONTROL DEVICE FOR MACHINE TOOL AND MACHINE TOOL INCLUDING THE CONTROL DEVICE

TECHNICAL FIELD

The present invention relates to a control device for a machine tool that machines a workpiece while sequentially segmenting chips generated during a cutting work, and a machine tool including the control device.

BACKGROUND ART

A conventional machine tool is known that includes a workpiece holding unit for holding a workpiece, a tool post to hold a cutting tool for cutting the workpiece, a feeding unit for feeding the cutting tool to the workpiece in a predetermined feed direction by relatively moving the workpiece holding unit and the tool post, a vibration unit for relatively vibrating the workpiece holding unit and the tool post so that the cutting tool is fed in the feed direction while reciprocally vibrating along the feed direction, and a rotating unit for relatively rotating the workpiece and the cutting tool (see Patent Literature 1, for example).

A control device of this machine tool drives and controls the rotating unit, the feeding unit, and the vibration unit and makes the machine tool machine the workpiece via the relative rotation of the workpiece and the cutting tool and via the feeding of the cutting tool in the feed direction to the workpiece with the reciprocal vibration.

CITATION LIST

Patent Literature

[Patent Literature 1] Japanese Patent No. 5033929 (see paragraph 0049)

SUMMARY OF INVENTION

Technical Problem

In the conventional machine tool, the control device can execute an operating instruction only in a predetermined period.

Thus, vibration frequency at which the workpiece holding unit and the tool post relatively vibrate is limited to a specific value that is dependent on the period in which the control device can execute an operating instruction.

The conventional machine tool, however, does not take into account the vibration frequency. Thus, there is a problem that the reciprocal vibration sometimes cannot be executed under a condition that is based on a number of rotations of the relative rotation and a number of vibrations of the cutting tool toward the workpiece per rotation of the workpiece desired by a user.

Therefore, the object of the present invention, which has been achieved for addressing the above described problem of the conventional art, is to provide a control device for a machine tool that enables the machine tool to smoothly cut a workpiece while segmenting chips by feeding a cutting tool in a feed direction while reciprocally vibrating the cutting tool along the feed direction on the basis of a condition set by a user, and a machine tool including the control device.

Solution to Problem

According to a first aspect of the present invention, a control device for a machine tool is provided that is disposed in a machine tool having a cutting tool for cutting a workpiece, a rotating unit for relatively rotating the cutting tool and the workpiece, a feeding unit for feeding the cutting tool and the workpiece in a predetermined feed direction, and a vibration unit for relatively reciprocally vibrating the cutting tool and the workpiece. The control device includes a control section to make the machine tool machine the workpiece via the relative rotation of the cutting tool and the workpiece and via the feeding of the cutting tool in the feed direction to the workpiece with the reciprocal vibration. The control section determines a number of rotations of the relative rotation and a number of vibrations of the reciprocal vibration per rotation of the relative rotation when the workpiece is machined in accordance with a vibration frequency dependent on a period in which an operating instruction can be executed.

According to a second aspect of the present invention, the control device includes a setting unit for utilizing the number of rotations, the number of vibrations, and the vibration frequency as parameters and setting a value of at least one of the parameters to the control section and a correcting unit for setting each of the rest of the parameters to a predetermined value and correcting the value of the at least one of the parameters set by the setting unit on the basis of the predetermined value of each of the rest of parameters.

According to a third aspect of the present invention, the vibration unit relatively reciprocally vibrates the cutting tool and the workpiece along the feed direction.

According to a fourth aspect of the present invention, the vibration unit relatively reciprocally vibrates the cutting tool and the workpiece so that a portion of the workpiece that is cut with the cutting tool in forward movement of the reciprocal vibration overlaps a portion of the workpiece that is cut with the cutting tool in backward movement of the reciprocal vibration.

According to a fifth aspect of the present invention, the correcting unit sets each of the rest of the parameters to a predetermined value and corrects the value of the at least one of the parameters set by the setting unit so that the number of rotations will be inversely proportional to the number of vibrations with a constant that is based on the vibration frequency.

According to a sixth aspect of the present invention, the at least one of the parameters whose value is set by the setting unit is the number of rotations, and the correcting unit sets the number of vibrations to a plurality of predetermined values, sets the vibration frequency to a predetermined value that the control device inherently has, and corrects the value of the number of rotations set by the setting unit on the basis of each of the predetermined values of the number of vibrations and the value of the vibration frequency set by the correcting unit.

According to a seventh aspect of the present invention, the at least one of the parameters whose value is set by the setting unit are the number of rotations and the number of vibrations, and the correcting unit corrects the values of the number of rotations and the number of vibrations set by the setting unit to values that are determined on the basis of the vibration frequency.

According to an eighth aspect of the present invention, the setting unit sets the number of vibrations as the number of rotations per vibration.

According to a ninth aspect of the present invention, the setting unit reads a number of vibrations written in a program block of a machining program of the machine tool as an argument and sets the read number of vibrations as the number of vibrations.

According to a tenth aspect of the present invention, the setting unit calculates and sets the number of rotations on the basis of a predetermined peripheral speed and a diameter of the workpiece.

According to an eleventh aspect of the present invention, the correcting unit corrects the value of the number of rotations set by the setting unit on the basis of a table correlating the number of vibrations, the vibration frequency, and the number of rotations to a value of the number of rotations in the table, and enables machining of the workpiece with the corrected value of the number of rotations as well as values of the number of vibrations and the vibration frequency that correspond to the corrected value of the number of rotations in the table.

According to a twelfth aspect of the present invention, the correcting unit determines a value to which the number of rotations is corrected in descending order of values of the number of vibrations and in descending order of values of the vibration frequency in the table.

According to a thirteenth aspect of the present invention, the control device includes an amplitude setting unit for setting amplitude of the reciprocal vibration proportionally to a feed amount of the cutting tool to the workpiece, and the amplitude setting unit and the vibration unit cooperate with each other so that a portion of the workpiece that is cut with the cutting tool in forward movement of the reciprocal vibration overlaps a portion of the workpiece that is cut with the cutting tool in backward movement of the reciprocal vibration.

According to a fourteenth aspect of the present invention, the amplitude setting unit reads a ratio of the amplitude to the feed amount written in a program block of a machining program of the machine tool as an argument and calculates and sets the amplitude on the basis of the ratio.

According to a fifteenth aspect of the present invention, a machine tool including the control device according to any one of the first to fourteenth aspects of the present invention is provided.

According to a sixteenth aspect of the present invention, the machine tool includes a spindle moving mechanism to move a spindle holding the workpiece in an axial direction and a tool post moving mechanism to move a tool post holding the cutting tool toward the spindle, and the feeding unit includes the spindle moving mechanism and the tool post moving mechanism and feeds the cutting tool to the workpiece via cooperation of the spindle moving mechanism and the tool post moving mechanism.

According to a seventeenth aspect of the present invention, a spindle holding the workpiece is fixed on the machine tool, the machine tool includes a tool post moving mechanism to move a tool post holding the cutting tool in multiple directions, and the feeding unit includes the tool post moving mechanism and feeds the cutting tool to the workpiece by moving the tool post in a feed direction toward the spindle positioned in the feed direction.

According to a eighteenth aspect of the present invention, a tool post holding the cutting tool is fixed on the machine tool, the machine tool includes a spindle moving mechanism to move a spindle holding the workpiece in multiple directions, and the feeding unit includes the spindle moving mechanism and feeds the cutting tool to the workpiece by moving the spindle in a feed direction toward the tool post positioned in the feed direction.

Advantageous Effects of Invention

The control device for a machine tool according to the aspects of the present invention can determine the number of rotations and the number of revolutions in accordance with the vibration frequency and can make the machine tool machine a workpiece smoothly while segmenting chips. For example, the control device can correct, by the correcting unit, a value of a parameter set by the setting unit to an approximate value of the value of the parameter. Accordingly, the control device can make the machine tool machine a workpiece smoothly while segmenting chips under a condition that is relatively close to a condition set by the setting unit.

This enables machining of the workpiece under a condition that is relatively close to a condition based on a value of a parameter intended by a user.

Also, because the amplitude setting unit and the vibration unit cooperate with each other so that a portion of the workpiece that is cut with the cutting tool in forward movement of the reciprocal vibration overlaps a portion of the workpiece that is cut with the cutting tool in backward movement of the reciprocal vibration, it is possible to maintain an appropriate amplitude of the reciprocal vibration by increasing the amplitude to reliably segment chips even when a feed amount is increased.

Also, the machine tool according to the aspects of the present invention can cut a workpiece smoothly while segmenting chips by virtue of the above-described control device for a machine tool.

BRIEF DESCRIPTION OF DRAWINGS

FIG. 5 is a diagram illustrating the relation between an instruction period and a vibration frequency in the first embodiment of the present invention.

FIG. 7 is a table including values of the number of rotations corresponding to the number of vibrations and the vibration frequency in a second embodiment of the present invention.

FIG. 9 is a diagram illustrating a part of a machining program in the third embodiment of the present invention.

DESCRIPTION OF EMBODIMENT

An embodiment of the present invention is not restricted to any particular form as long as the embodiment relates to a control device for a machine tool provided in a machine tool having a cutting tool for cutting a workpiece, a rotating unit for relatively rotating the cutting tool and the workpiece, a feeding unit for feeding the cutting tool and the workpiece in a predetermined feed direction, and a vibration unit for relatively reciprocally vibrating the cutting tool and the workpiece, the control device including a control section to make the machine tool machine the workpiece via the relative rotation of the cutting tool and the workpiece and via the feeding of the cutting tool in the feed direction to the workpiece with the reciprocal vibration, wherein the control section determines a number of rotations of the relative rotation and a number of vibrations of the reciprocal vibration per rotation of the relative rotation when the workpiece is machined in accordance with a vibration frequency dependent on a period in which an operating instruction can be executed, so that the control device can determine the number of rotations and the number of revolutions in accordance with the vibration frequency and can make the machine tool machine a workpiece smoothly while segmenting chips, and the control device can correct, by the correcting unit, a value of a parameter set by the setting unit to an approximate value of the value of the parameter, for example, which makes it possible to make the machine tool machine a workpiece smoothly while segmenting chips under a condition that is relatively close to a condition set by the setting unit.

[First Embodiment]

Figure 1:
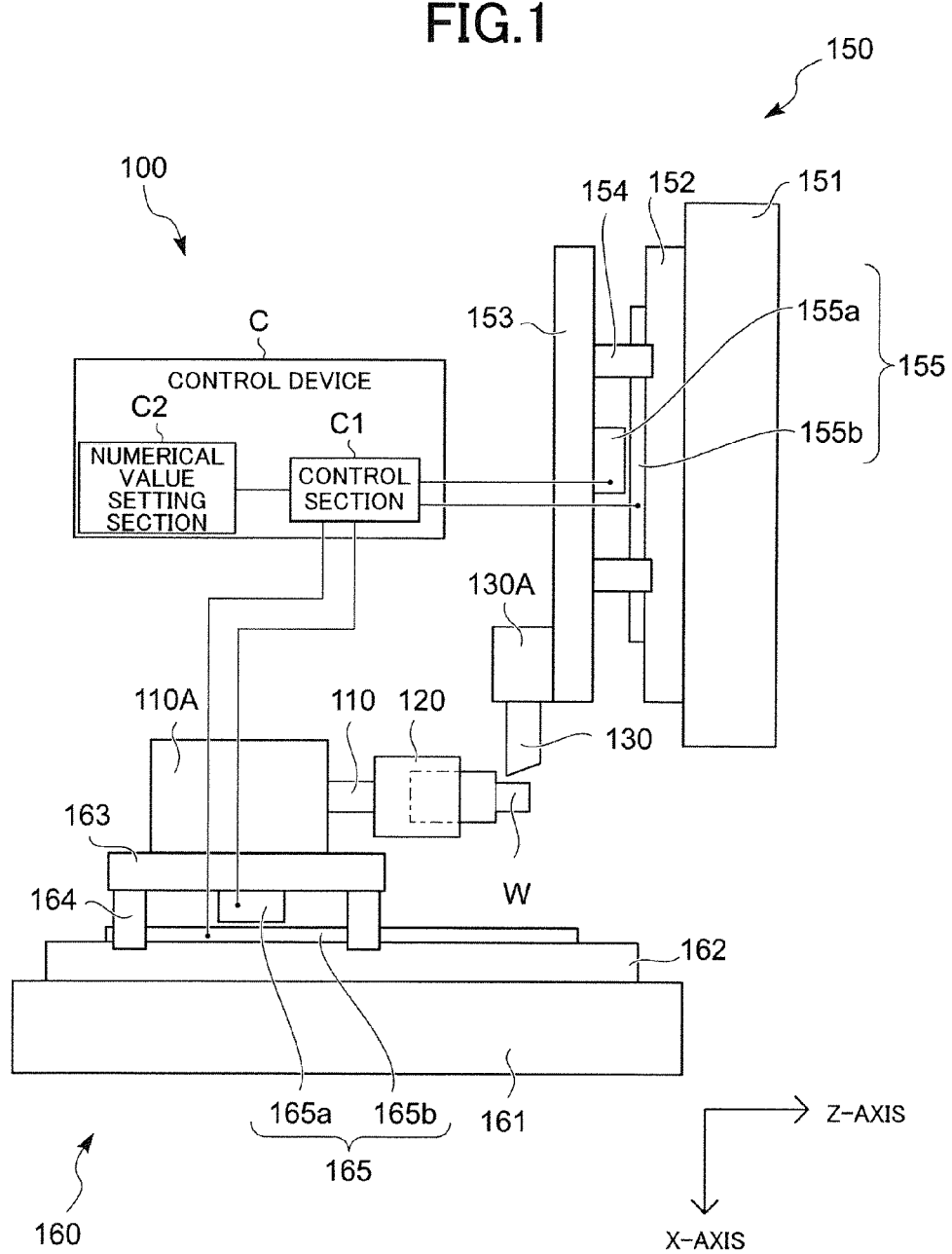
FIG. 1 is a diagram schematically illustrating a machine tool of a first embodiment of the present invention.

FIG. 1 is a diagram schematically illustrating a machine tool 100 including a control device C of a first embodiment of the present invention.

The machine tool 100 includes a spindle 110 and a cutting tool post 130A.

A chuck 120 is provided at a front end of the spindle 110.

A workpiece W is held by the spindle 110 via the chuck 120, and the spindle 110 is configured as a workpiece holding unit for holding a workpiece.

The spindle 110 is supported by a spindle headstock 110A so as to be rotatably driven by a spindle motor that is not illustrated.

As the spindle motor in the spindle headstock 110A, a conventionally known built-in motor formed between the spindle headstock 110A and the spindle 110 is conceivable, for example.

The spindle headstock 110A is mounted on a side of a bed of the machine tool 100 so as to be movable in a Z-axis direction, which is an axial direction of the spindle 110, by a Z-axis direction feeding mechanism 160.

The spindle 110 is moved in the Z-axis direction by the Z-axis direction feeding mechanism 160 via the spindle headstock 110A.

The Z-axis direction feeding mechanism 160 constitutes a spindle moving mechanism to move the spindle 110 in the Z-axis direction.

The Z-axis direction feeding mechanism 160 includes a base 161, which is integrated with a stationary side of the Z-axis direction feeding mechanism 160 including the bed, and a Z-axis direction guide rail 162 provided on the base 161 and extending in the Z-axis direction.

The Z-axis direction guide rail 162 slidably supports a Z-axis direction feeding table 163 via a Z-axis direction guide 164.

A mover 165a of a linear servo motor 165 is provided on a side of the Z-axis direction feeding table 163, and a stator 165b of the linear servo motor 165 is provided on a side of the base 161.

The spindle headstock 110A is mounted on the Z-axis direction feeding table 163, and the Z-axis direction feeding table 163 is moved by the linear servo motor 165 in the Z-axis direction.

Due to the movement of the Z-axis direction feeding table 163, the spindle headstock 110A moves in the Z-axis direction, enabling movement of the spindle 110 in the Z-axis direction.

A cutting tool 130 such as a tool bit for cutting the workpiece W is attached to the cutting tool post 130A.

The cutting tool post 130A constitutes a tool post that holds a cutting tool.

The cutting tool post 130A is provided on the side of the bed of the machine tool 100 so as to be movable in an X-axis direction, which is orthogonal to the Z-axis direction, and a Y-direction, which is orthogonal to the Z-axis direction and the X-axis direction, by virtue of an X-axis direction feeding mechanism 150 and a Y-axis direction feeding mechanism that is not illustrated.

The X-axis direction feeding mechanism 150 and the Y-axis direction feeding mechanism constitute a tool post moving mechanism to move the cutting tool post 130A in the X-axis direction and the Y-axis direction toward the spindle 110.

The X-axis direction feeding mechanism 150 includes a base 151, which is integrated with a stationary side of the X-axis direction feeding mechanism 150, and an X-axis direction guide rail 152 provided on the base 151 and extending in the X-axis direction.

The X-axis direction guide rail 152 slidably supports an X-axis direction feeding table 153 via an X-axis direction guide 154.

A mover 155a of a linear servo motor 155 is provided on a side of the X-axis direction feeding table 153, and a stator 155b of the linear servo motor 155 is provided on a side of the base 151.

The X-axis direction feeding table 153 is moved by the linear servo motor 155 in the X-axis direction.

The Y-axis direction feeding mechanism has the same configuration as the X-axis direction feeding mechanism 150 except being arranged in the Y-axis direction, and is thus not illustrated and described herein in detail.

In FIG. 1, the X-axis direction feeding mechanism 150 is mounted on the side of the bed via the Y-axis direction feeding mechanism that is not illustrated, and the cutting tool post 130A is mounted on the X-axis direction feeding table 153.

The cutting tool post 130A is moved in the X-axis direction by the X-axis direction feeding table 153 and is moved in the Y-axis direction by the Y-axis direction feeding mechanism, which operates in the Y-axis direction in a similar manner to the X-axis direction feeding mechanism 150.

Alternatively, the Y-axis direction feeding mechanism not illustrated herein may be mounted on the side of the bed via the X-axis direction feeding mechanism 150, and the cutting tool post 130A may be mounted on a side of the Y-axis direction feeding mechanism. The configuration for moving the cutting tool post 130A in the X-axis direction and the Y-axis direction via the X-axis direction feeding mechanism 150 and the Y-axis direction feeding mechanism is conventionally known and is thus not described and illustrated herein in detail.

The tool post moving mechanism (the X-axis direction feeding mechanism 150 and the Y-axis direction feeding mechanism) and the spindle moving mechanism (the Z-axis direction feeding mechanism 160) cooperate to feed the cutting tool 130 attached to the cutting tool post 130A in any feed direction with respect to the workpiece W via movement of the cutting tool post 130 in the X-axis direction and the Y-axis direction by the X-axis direction feeding mechanism 150 and the Y-axis direction feeding mechanism and via movement of the spindle headstock 110A (the spindle 110) in the Z-axis direction by the Z-axis direction feeding mechanism 160.

Figure 2:
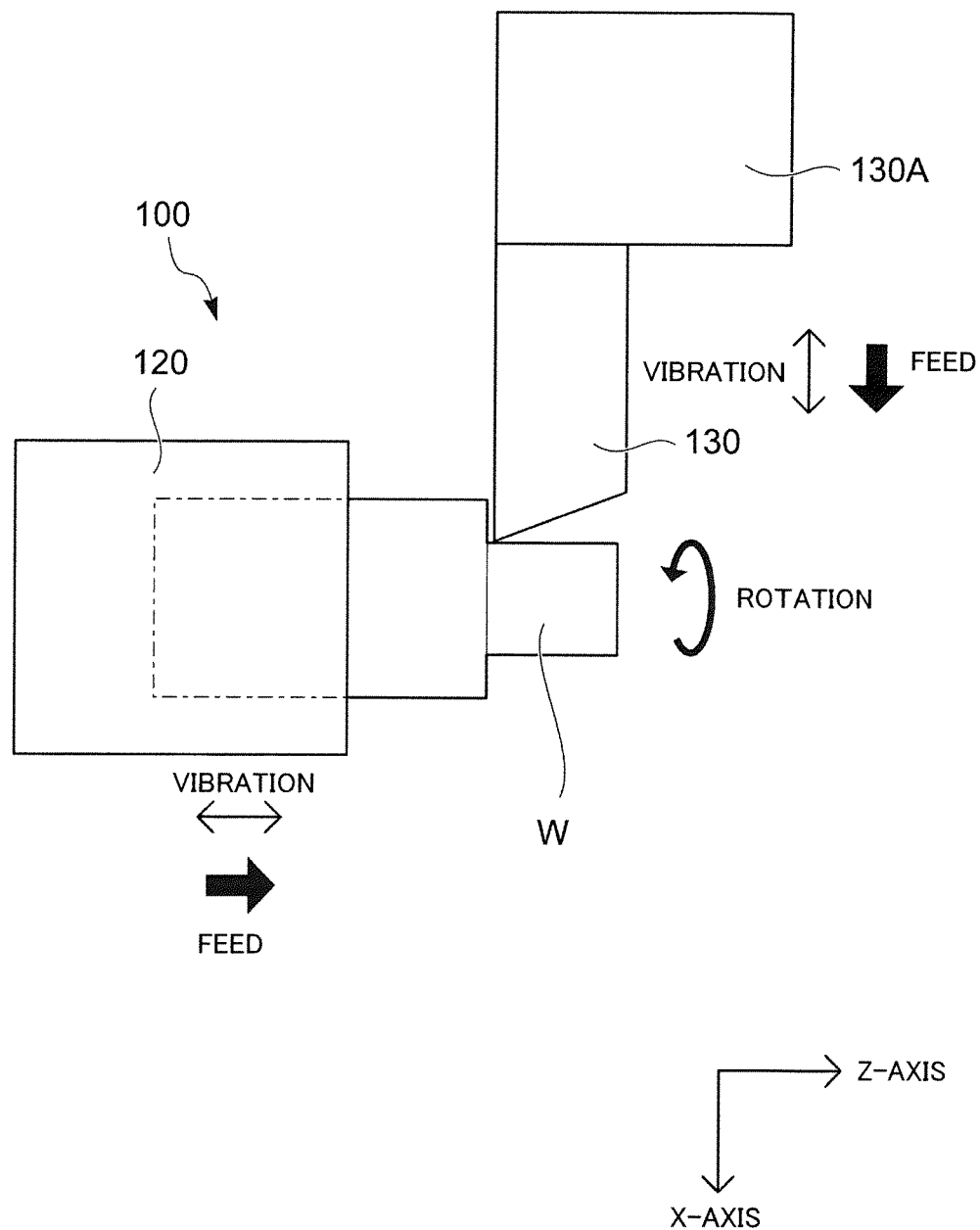
FIG. 2 is a schematic diagram illustrating the relation between a cutting tool and a workpiece in the first embodiment of the present invention.

Due to the feeding of cutting tool 130 in any feed direction with respect to the workpiece W by a feeding unit including the spindle moving mechanism (the Z-axis direction feeding mechanism 160) and the tool post moving mechanism (the X-axis direction feeding mechanism 150 and the Y-axis direction feeding mechanism), the workpiece W is cut into any shape by the cutting tool 130 as illustrated in FIG. 2.

In the present embodiment, both the spindle headstock 110A and the cutting tool post 130A are configured as movable. Alternatively, the spindle headstock 110A may be immovably fixed on the side of the bed of the machine tool 100, and the tool post moving mechanism may be configured to move the cutting tool post 130A in the X-axis direction, the Y-axis direction, and the Z-axis direction.

In this case, the feeding unit includes a tool post moving mechanism that moves the cutting tool post 130A in the X-axis direction, the Y-axis direction, and the Z-axis direction. By moving the cutting tool post 130A with respect to the spindle 110 rotated at a fixed position, the cutting tool 130 can be fed to the workpiece W.

Alternatively, the cutting tool post 130A may be immovably fixed on the side of the bed of the machine tool 100, and the spindle moving mechanism may be configured to move the spindle headstock 110A in the X-axis direction, the Y-axis direction, and the Z-axis direction.

In this case, the feeding unit includes a spindle headstock moving mechanism that moves the spindle headstock 110A in the X-axis direction, the Y-axis direction, and the Z-axis direction. By moving the spindle headstock 110A with respect to the cutting tool post 130A located at a fixed position, the cutting tool 130 can be fed to the workpiece W.

Although in the present embodiment the X-axis direction feeding mechanism 150, the Y-axis direction feeding mechanism, and the Z-axis direction feeding mechanism 160 are configured to be moved by a linear servo motor, they may be moved by a conventional ball screw and a servo motor.

In the present embodiment, the spindle motor such as the built-in motor constitutes a rotating unit for relatively rotating the workpiece W and the cutting tool 130, and the relative rotation of the workpiece W and the cutting tool 130 is achieved by rotation of the spindle 110.

In the present embodiment, the workpiece W is rotated with respect to the cutting tool 130. Alternatively, the cutting tool 130 may be rotated with respect to the workpiece W.

In this case, a rotary tool such as a drill may be used as the cutting tool 130.

The spindle 110, the Z-axis direction feeding mechanism 160, the X-axis direction feeding mechanism 150, and the Y-axis direction feeding mechanism are driven and controlled by a control section C1 of the control device C.

The control section C1 is preliminarily set up to execute the control so that the spindle headstock 110A or the cutting tool post 130A is moved in each moving direction while reciprocally vibrating along the each moving direction by utilizing each feeding mechanism as a vibration unit.

Figure 3:
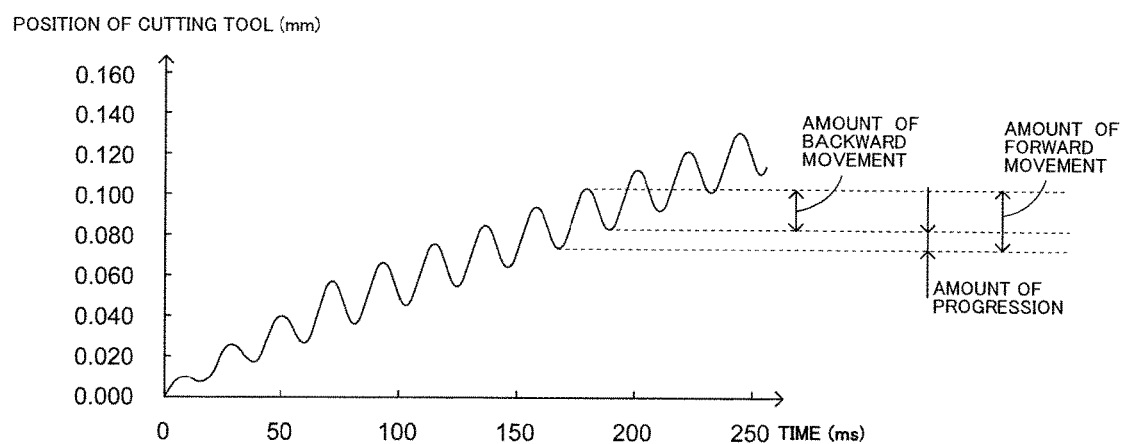
FIG. 3 is a diagram illustrating reciprocal vibration and a position of the cutting tool in the first embodiment of the present invention.

Owing to the control of the control section C1, each feeding mechanism moves the spindle 110 or the cutting tool post 130A forward (forward movement) for a predetermined amount of forward movement and then moves it backward (backward movement) for a predetermined amount of backward movement in one reciprocal vibration, so that the spindle 110 or the cutting tool post 130A moves forward for an amount of progression, which is the difference between the amount of forward movement and the amount of backward movement, in each moving direction, as illustrated in FIG. 3. In this manner, the feeding mechanisms cooperatively feed the cutting tool 130 to the workpiece W in the feed direction.

The machine tool 100 machines the workpiece W by moving the cutting tool 130 in the feed direction while reciprocally vibrating the cutting tool 130 along the feed direction by the Z-axis direction feeding mechanism 160, the X-axis direction feeding mechanism 150, and the Y-axis direction feeding mechanism for a feed amount, which is the total of the amount of progression while the spindle rotates one rotation, or while a phase of the spindle changes from 0 to 360 degrees.

Figure 4:
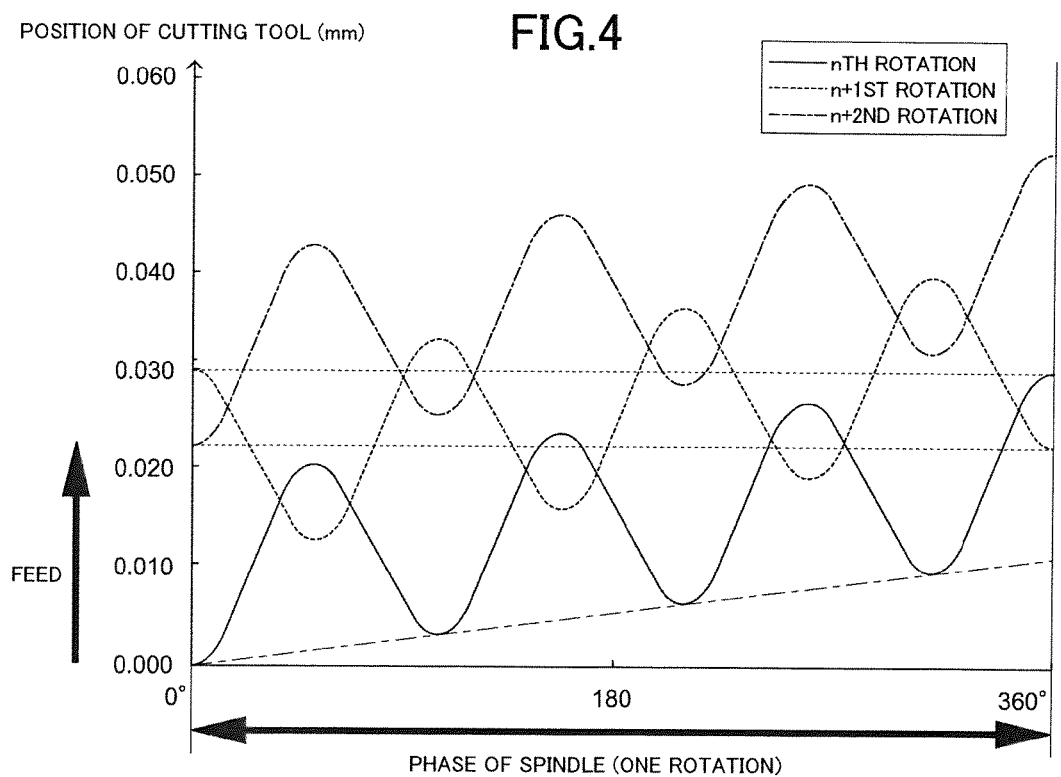
FIG. 4 is a diagram illustrating the relation between the nth rotation, the n+1th rotation, and the n+2th rotation of a spindle in the first embodiment of the present invention.

When the workpiece W is cut into a predetermined shape with the cutting tool 130 by moving the spindle headstock 110A (spindle 110) or the cutting tool post 130A (cutting tool 130) that are reciprocally vibrating while the workpiece W is rotating, a peripheral surface of the workpiece W is cut sinusoidally, as illustrated in FIG. 4.

A virtual line (indicated with a one-dot chain line) that connects the valleys of the sinusoidal waveform indicates the feed amount while the phase of the spindle changes from 0 to 360 degrees.

FIG. 4 illustrates an example in which a number of vibrations N of the spindle headstock 110A (spindle 110) or the cutting tool post 130A per rotation of the workpiece W is 3.5(N=3.5).

In this case, the phase of the peripheral surface of the workpiece W that is cut with the cutting tool 130 in the n+1th rotation (n is equal to or larger than 1) of the spindle 110 is shifted from the phase of the peripheral surface of the workpiece W that is cut with the cutting tool 130 in the nth rotation of the spindle 110 in a direction indicating the phase of the spindle (the horizontal axis direction of the chart).

Thus, the positions of the shallowest points of the valleys of the phase in the n+1th rotation (the peaks of the ridges of the waveform illustrated with a dotted line in the chart, the peaks indicating the deepest cutting points in the feed direction of the cutting tool 130) are shifted with respect to the positions of the shallowest points of the valleys of the phase in the nth rotation (the peaks of the ridges of the waveform illustrated with a solid line in the chart) in the direction indicating the phase of the spindle.

Thus, a portion of the workpiece W that is cut with the cutting tool 130 in forward movement of the reciprocal vibration partially overlaps a portion of the workpiece W that is cut with the cutting tool 130 in backward movement of the reciprocal vibration. In other words, a portion of the peripheral surface of the workpiece W that is cut with the cutting tool 130 in the n+1th rotation of the workpiece W includes a portion of the peripheral surface of the workpiece W that has been cut in the nth rotation of the workpiece W. In that overlapping portion, the cutting tool 130 performs "air-cut", in which the cutting tool 130 does not cut any part of the workpiece W.

Due to the air-cut, chips generated during a cutting work of the workpiece W are sequentially segmented.

The machine tool 100 can thus cut the workpiece W smoothly while segmenting chips by the reciprocal vibration of the cutting tool 130 along the feed direction.

In order to segment chips by the reciprocal vibration of the cutting tool 130, it is enough that a portion of the peripheral surface of the workpiece W that is cut in the n+1th rotation includes a portion of the peripheral surface of the workpiece W that has already been cut in the nth rotation.

In other words, it is enough that the path of the cutting tool in backward movement on the peripheral surface of the workpiece in the n+1 rotation reaches the path of the cutting tool on the peripheral surface of the workpiece in the nth rotation.

The phase of the shape of the workpiece W cut with the cutting tool 130 in the n+1th rotation does not need to be inverted 180 degrees with respect to the phase of the shape of the workpiece W in the nth rotation, as long as these phases are not coincident (synchronized) with each other.

The number of vibrations N may be 1.1, 1.25, 2.6, or 3.75, for example.

Also, the vibration may be set up to be executed less than one time per rotation of the workpiece W (that is, 0<N<1.0).

In this case, the spindle 110 rotates more than one rotation per vibration.

The number of vibrations N may also be set as a number of rotations of the spindle 110 per vibration.

In the machine tool 100, the control section C1 executes an operating instruction in a predetermined instruction period.

The reciprocal vibration of the spindle headstock 110A (spindle 110) or the cutting tool post 130A (cutting tool 130) can be executed in a predetermined frequency that is based on the instruction period.

For example, in case of the machine tool 100 that can send 250 instructions per second by the control section C1, an operating instruction by the control section C1 is executed in a period of 1/250=4 milliseconds (base period).

The instruction period is determined on the basis of the base period, and is usually an integer multiple of the base period.

The reciprocal vibration can be executed in a frequency according to the instruction period.

As illustrated in FIG. 5, suppose that the instruction period is 16 (ms), which is a four-times multiple of the base period (4 (ms)), for example. Then, forward and backward movement of the reciprocal vibration occurs every 16 milliseconds, and the spindle headstock 110A (spindle 110) or the cutting tool post 130A (cutting tool 130) can reciprocally vibrate in a frequency of 1/(0.004×4)=62.5 (Hz).

The spindle headstock 110A (spindle 110) or the cutting tool post 130A (cutting tool 130) may reciprocally vibrate only in one of a plurality of other predetermined sporadic frequencies, such as 1/(0.004×5)=50 (Hz), 1/(0.004×6)=41.666 (Hz), 1/(0.004×7)=35.714 (Hz), and 1/(0.004×8)=31.25 (Hz), for example.

The frequency of the reciprocal vibration (vibration frequency) f (Hz) of the spindle headstock 110A (spindle 110) or the cutting tool post 130A (cutting tool 130) is set to one of the above frequencies.

It is noted that, depending on the control device C (control section C1), the instruction period may be set to a multiple other than an integer multiple of the base period (4 ms).

In this case, the vibration frequency may be set to a frequency according to that instruction period.

When the spindle headstock 110A (spindle 110) or the cutting tool post 130A (cutting tool 130) reciprocally vibrates and the number of rotations of the spindle 110 is S(r/min), the number of vibrations N is calculated as N=f× 60/S.

Figure 6:
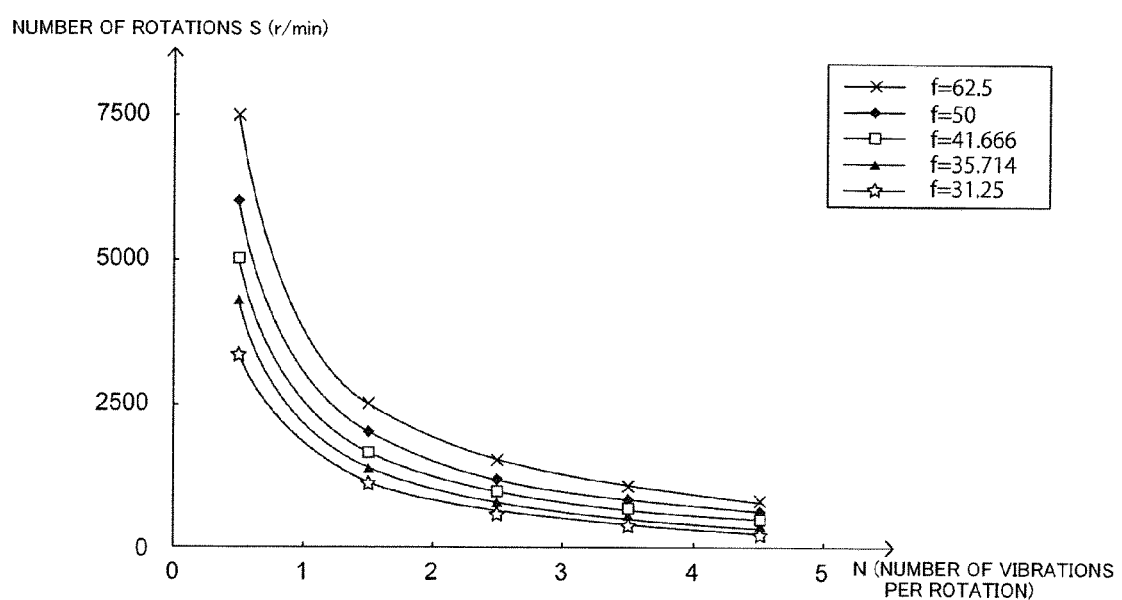
FIG. 6 is a diagram illustrating a relation between a number of vibrations, a number of rotations, and a vibration frequency in the first embodiment of the present invention.

As illustrated in FIG. 6, the number of rotations S is inversely proportional to the number of vibrations N with a constant being the vibration frequency f.

The spindle 110 can rotate faster as the vibration frequency f becomes higher or the number of vibrations N becomes smaller.

The machine tool 100 of the present embodiment is configured such that the number of rotations S, the number of vibrations N, and the vibration frequency f are utilized as parameters, and a user can set two of the three parameters, that is, the number of rotations S and the number of vibrations N, to the control section C1 via a numerical value setting section C2 or the like.

The number of rotations S or the number of vibrations N can be set to the control section C1 by inputting a value of the number of rotations S or the number of vibrations N to the control section C1 as a parameter value. Alternatively, a value of the number of rotations S or the number of vibrations N may be set by writing a value in a machining program, or the number of vibrations N may be set in a program block (one line of a program) as an argument, for example.

Particularly, if a setting unit is configured so that the number of vibrations N can be set in a program block of a machining program as an argument, a user can easily set the number of rotations S and the number of vibrations N from the machining program via the number of rotations S of the spindle 110, which is usually written in the machining program, and the number of vibrations N, which is written as an argument in the program block.

Setting via the setting unit may be executed through a program or by a user via the numerical value setting section C2.

Alternatively, the setting unit may be configured such that a peripheral speed and a diameter of the workpiece may be set and input through a machining program or the like so that the number of rotations S can be calculated and set on the basis of the peripheral speed and the diameter of the workpiece.

By configuring the setting unit to calculate the number of rotation S on the basis of the peripheral speed and the diameter of the workpiece that are set and input via a machining program or the like, the number of rotations S can be easily set on the basis of the peripheral speed determined according to material of the workpiece W or type, shape, or material of the cutting tool 130 without being noticed by a user.

Based on the number of rotations S and the number of vibrations N set by the setting unit, the control section C1 rotates the spindle 110 at the number of rotations S and moves the spindle 110A or the cutting tool post 130A while reciprocally vibrating the spindle 110A or the cutting tool post 130A so that the cutting tool 130 is fed in the feed direction while reciprocally vibrating along the feed direction at the number of vibrations N.

However, because the number of rotations S and the number of vibrations N are dependent on the vibration frequency f as described above, the control section C1 includes a correcting unit for correcting the number of rotations S and the number of vibrations N set by the setting unit on the basis of the vibration frequency f.

The correcting unit may be configured to set the vibration frequency f to a value that is close to a value calculated from the number of vibrations N and the set number of rotations S set by the setting unit on the basis of the formula N=60 f/S and, based on the vibration frequency f set by the correcting unit, correct the number of vibrations N and the number of rotations S to values that are close to the values set by the setting unit.

For example, suppose that a user sets S=3000 (r/min) and N=1.5.

In this case, on the basis of S =3000 (r/min) and N=1.5, a value of the vibration frequency f can be calculated as 75 (Hz). Thus, the correcting unit sets the vibration frequency f to 62.5 (Hz), for example.

Based on the set vibration frequency (62.5 Hz), the correcting unit may correct the number of vibrations N to 1.25 while maintaining the number of rotations S (3000 (r/min)), or correct the number of rotations S to 2500 (r/min) while maintaining the number of vibrations N(1.5), for example.

It is also possible to set the vibration frequency f to 50 (Hz) and correct both the number of rotations S and the number of vibrations N to 2400 (r/min) and 1.25, respectively.

By virtue of the correction of the number of rotations S and the number of vibrations N by the correcting unit, the machine tool 100 can feed the cutting tool 130 in the feed direction while reciprocally vibrating the cutting tool 130 along the feed direction via the Z-axis direction feeding mechanism 160, the X-axis direction feeding mechanism 150, and the Y-axis direction feeding mechanism under a condition based on the number of vibrations N and the number of rotations S set by the setting unit to smoothly cut the workpiece W while segmenting chips. In some cases, it is also possible to extend the life of the cutting tool 130, for example.

Accordingly, it is possible to machine the workpiece W under a condition that is relatively close to a condition that is based on the number of rotations S and the number of vibrations N intended by a user.

In this case, it is also possible to change the condition of correction by preferentially correcting either the number of rotations S or the number of vibrations N or by correcting both the number of rotations S and the number of vibrations N, for example, on the basis of machining condition or the like.

Another configuration is also possible in which the vibration frequency f used in the setting unit is preliminarily set by a used and the number of vibrations N and the number of rotations S are corrected on the basis of the vibration frequency f set by the user.

In this case, the control section C1 can be kept in a particularly stable control state, and the cutting tool 130 can be fed in the feed direction while reciprocally vibrating along the feed direction to cut an outer shape of the workpiece W smoothly and stably while segmenting chips.

On the other hand, in order to reduce a cycle time of machining, the spindle 110 should be rotated as fast as possible.

To do that, the vibration frequency f needs be set as high as possible. However, it is not easy to set the vibration frequency f to an unnecessarily high value in terms of stability of control, for example.

Thus, the number of rotations S can be made as large as possible by setting the number of vibrations N as small as possible.

In this case, the number of rotations S can be easily increased by configuring the setting unit to set the number of vibrations N on the basis of the number of rotations per vibration of the spindle 110.

The spindle 110 can be rotated in a high speed by setting the number of rotations per vibration of the spindle 110 to equal to or larger than one, causing the number of vibrations N to be set to larger than zero but smaller than one.

However, because the length of segmented chips becomes relatively longer, the number of vibrations N should be set to a value that does not adversely affect the machining The present embodiment is configured such that the number of vibrations N and the number of rotations S of the three parameters are set to the control section C1 via the numerical value setting section C2. Alternatively, the number of vibrations N may be fixed in advance (that is, the number of vibrations N does not needs to be input) and only the number of rotations S may be set by a user as one of the three parameters, so that the vibration frequency f can be set on the basis of the number of rotations S set by a user and the number of vibrations N fixed in advance and then the number of rotations S or the number of vibrations N can be corrected.

[Second Embodiment]

A second embodiment is similar to the first embodiment except some modification including condition of parameters and is common with the first embodiment in many elements. Thus, detailed description of similar points is omitted and description of different points will now be given.

The machine tool 100 of the second embodiment is configured such that a user sets the number of rotations S to the control section C1 via the numerical value setting section C2 or the like.

The number of rotations S can be set to the control section C1 by inputting a value of the number of rotations S to the control section C1 as a parameter value. Alternatively, a value of the number of rotations S may be set by writing the value in a machining program.

Based on the number of rotations S set by a user, the control section C1 rotates the spindle 110 and moves the spindle headlock 110A or the cutting tool post 130A while vibrating the spindle headlock 110A or the cutting tool post 130A so that the cutting tool 130 is fed in the feed direction while reciprocally vibrating along the feed direction.

However, because the number of rotations S and the number of vibrations N are determined on the basis of the vibration frequency f as described above, the correcting unit of the control section C1 of the present embodiment is configured to correct the set number of rotations S on the basis of the vibration frequency f.

As illustrated in FIG. 7, the correcting unit of the present embodiment has a table of values of the number of rotations S11, S12, S13 . . . , S21 . . . , S31 . . . of the spindle 110 corresponding to values of the number of reciprocal vibrations per rotation of the spindle N1, N2, N3 . . . and values of the vibration frequency f1, f2, f3 . . . dependent on a period in which an operating instruction can be executed.

The correcting unit is configured to correct a value of the number of rotations S set by a user to one of values of the number of rotations S in the table.

The control device C is configured to machine the workpiece W at the number of vibrations and in the vibration frequency corresponding to the corrected number of rotations.

The table in FIG. 7 illustrates an example in which the number of vibrations N is either N1=3.5, N2=2.5, N3=1.5, or N4=0.5, the vibration frequency f is either f1=62.5 (Hz), f2=50 (Hz), or f3=41.666 (Hz), and the number of rotations S corresponding to the number of vibrations N and the vibration frequency f is either S11=1071.429 (r/min), S12=857.1429 (r/min), S13=714.2743 (r/min), S21=1500 (r/min), S31=2500 (r/min), and the like.

The correcting unit is configured to compare the value of the number of rotations S set by a user with the values of the number of rotations in the table and to correct the value set by the user to any one of the values in the table whose difference from the value set by the user is within a predetermined range (such as ±50 r/min).

In the present embodiment, correction of the number of rotations S by the correcting unit is configured such that a value of the number of rotations to which the correction is executed is determined in descending order of the values of the number of vibrations and in descending order of the values of the vibration frequency in the table.

For example, suppose that a user sets the number of rotations S of the spindle 110 to 2500 (r/min).

In this case, the value S=2500 (r/min) is firstly compared with the values in the line of the highest number of vibrations (N1=3.5) in the table in descending order of the values of the vibration frequency (f1=62.5 (Hz), f2=50 (Hz), f3=41.666 (Hz)).

That is, the value S=2500 (r/min) is compared with S11=1071.429 (r/min), S12=857. 1429 (r/min), and S13=714.2743 (r/min) in sequence.

Next, the value S=2500 (r/min) is compared with the values in the line of the next highest number of vibrations (N2=2.5) in descending order of the values of the vibration frequency (f1=62.5 (Hz), f2=50 (Hz), f3=41.666 (Hz)). That is, the value S=2500 (r/min) is compared with S21=1500 (r/min), S22=1200 (r/min), and S23=999.984 (r/min) in sequence.

Next, the value S=2500 (r/min) is compared with the values in the line of the next highest number of vibrations (N3=1.5) in descending order of the values of the vibration frequency (f1=62.5 (Hz), f2=50 (Hz), f3=41.666 (Hz)). That is, the value S=2500 (r/min) is compared with S31=2500 (r/min), S32=2000 (r/min), and S33=1666.64 (r/min) in sequence. In this case, because S31=2500 (r/min) is equal to (or within a predetermined range of difference with respect to) the value set by the user, the correcting unit sets the number of rotations S of the spindle 110 to S31=2500 (r/min) (that is, no correction is executed eventually in this example).

The control section C1 enables machining of the workpiece W at the number of vibrations N=1.5 and in the vibration frequency f=62.5 (Hz) that correspond to the number of rotations S3=2500 (r/min) in the table.

Due to the correction of the number of rotations S by the correcting unit, the machine tool 100 can feed the cutting tool 130 in the feed direction while reciprocally vibrating the cutting tool 130 along the feed direction by the Z-axis direction feeding mechanism 160, the X-axis direction feeding mechanism 150, and the Y-axis direction feeding mechanism under a condition that is based on the number of rotations S set by the setting unit to cut the workpiece W smoothly while segmenting chips.

In this case, because a highest possible value is adopted for the number of vibrations N and the vibration frequency f, machining is executed at a highest possible value of the number of rotations S of the spindle 210. Thus, the length of chips can be reduced while shortening a machining time.

Also, because a highest possible value is adopted for the vibration frequency f, negative effect on machining accuracy can be reduced.

If none of the values of the number of rotations S11, S12, S13 . . . in the table is within a predetermined range of difference (such as ±50 r/min) from the value of the number of rotations S set by a user, then the correcting unit may correct the value of the number of rotations S set by the user to one of the values of the number of rotations S11, S12, S13 . . . in the table which has the smallest difference from the value of the number of rotations S set by the user.

This enables to select one of the values of the number of rotations S11, S12, S13 . . . that is as much close as possible to the value of the number of rotations S set by a user so that the user's setting can be reflected as much as possible.

[Third Embodiment]

A third embodiment is common with the first and second embodiments in many elements. Thus, detailed description of similar points is omitted and description of different points will now be given.

As with the first and second embodiments, the machine tool 100 of the third embodiment is configured such that, when a user sets two of the three parameters (the number of rotations S and the number of vibrations N) or one of the three parameters (the number of rotations S) to the control section C1, the machine tool 100 can feed the cutting tool 130 in the feed direction while reciprocally vibrating the cutting tool 130 along the feed direction under a condition that is relatively close to a condition that is based on the number of rotations S and the number of vibrations N intended by the user or a condition that is based on the number of rotations S set by the user to cut the workpiece W smoothly while segmenting chips.

Figure 8A:
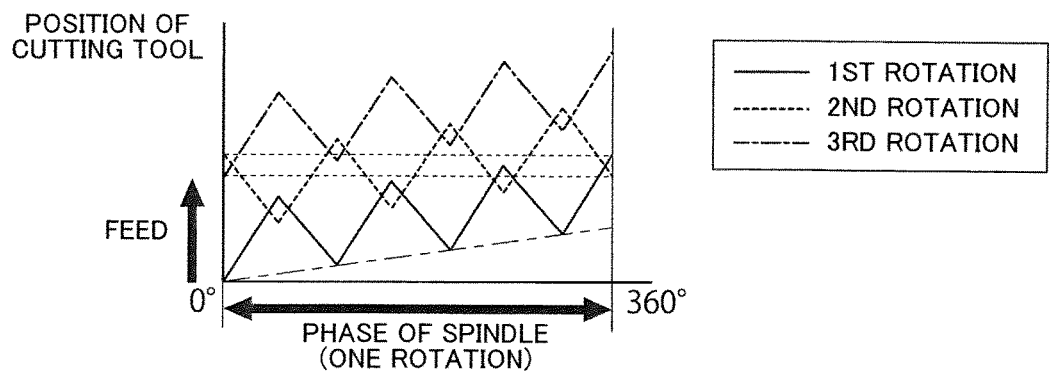
FIG. 8A is a diagram illustrating an appropriate relation between feed amount and amplitude in a third embodiment of the present invention.
Figure 8B:
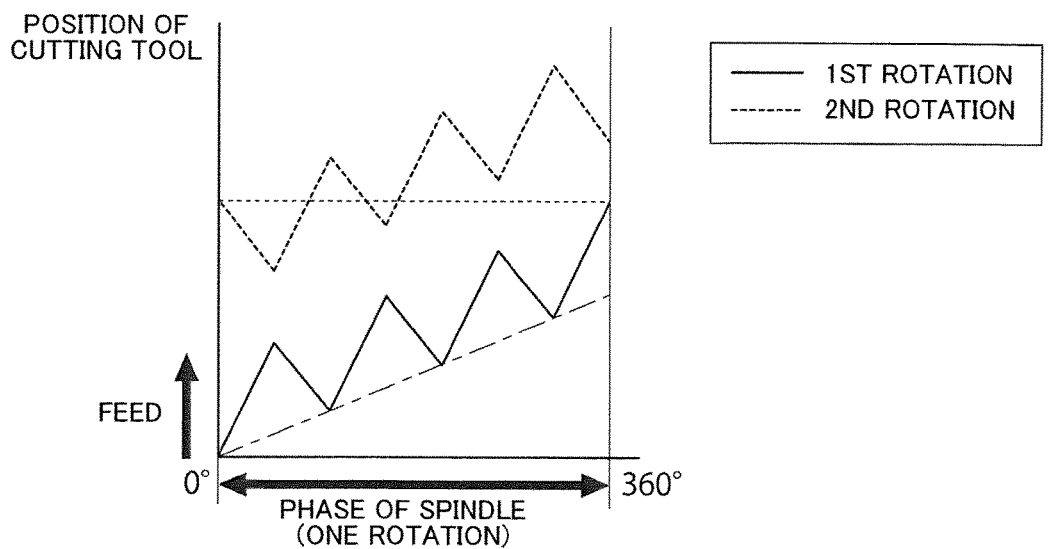
FIG. 8B is a diagram illustrating an appropriate relation between feed amount and amplitude in the third embodiment of the present invention.

Similar to FIG. 4, FIG. 8A illustrates a condition in which the cutting tool 130 vibrates 3.5 times per rotation of the spindle and a portion of the workpiece W that is cut with the cutting tool 130 in forward movement of the reciprocal vibration partially overlaps a portion of the workpiece W that is cut with the cutting tool 130 in backward movement of the reciprocal vibration. A portion of the peripheral surface of the workpiece W that is cut in the n+1th rotation of the workpiece W includes a portion of the peripheral surface of the workpiece W that has been cut in the nth rotation of the workpiece W. This means that air-cut with the cutting tool 130 occurs in a cutting work. If the feed amount is simply increased in this condition as illustrated in FIG. 8B, the path of the cutting tool 130 in backward movement in the second rotation does not reach the path of the cutting tool 130 in the first rotation. Thus, the above-described air-cut cannot be executed and chips may not be segmented.

Figure 8C:
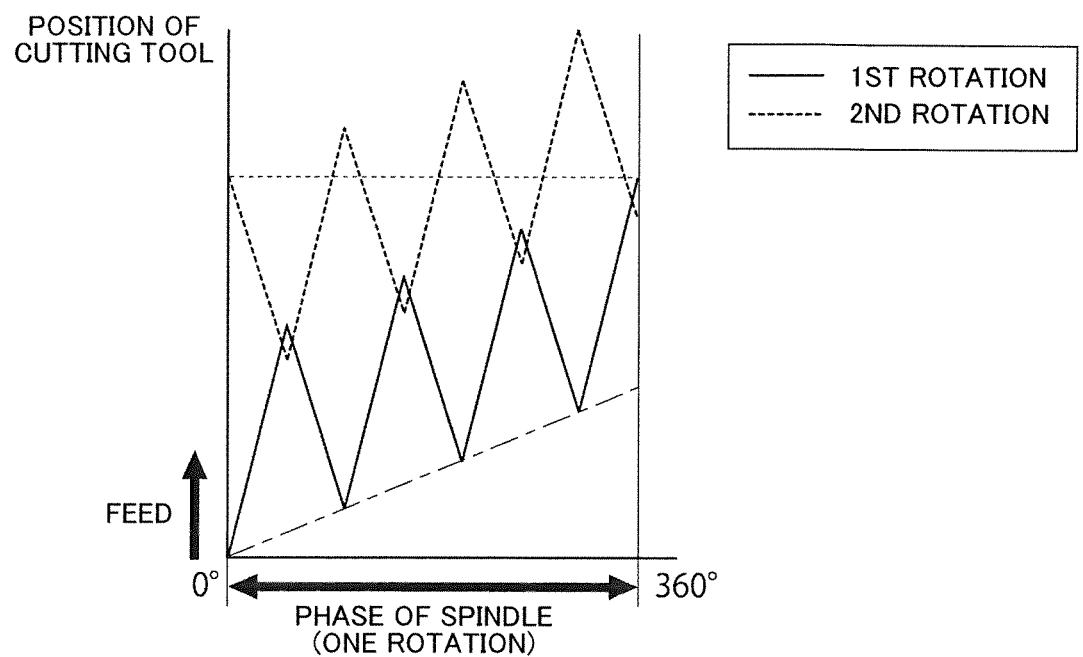
FIG. 8C is a diagram illustrating an appropriate relation between feed amount and amplitude in the third embodiment of the present invention.

It is noted that, in FIGS. 8A to 8C, vibrations of the cutting tool 130 are illustrated with straight lines for simplicity's sake.

In other words, if the feed amount is simply increased in a gradual manner, the overlapping portion between the portion that is cut with the cutting tool 130 in forward movement of the reciprocal vibration and the portion that is cut with the cutting tool 130 in backward movement of the reciprocal vibration gradually becomes smaller and eventually disappears. Thus, the air-cut cannot be executed and chips may not be segmented.

Thus, in the present embodiment, the control section C1 includes an amplitude setting unit for setting amplitude of the reciprocal vibration of the cutting tool 130 proportionally to the feed amount of the cutting tool 130 toward the workpiece W.

The amplitude setting unit is configured such that, when a user sets a ratio of the amplitude to the feed amount, that is, a ratio between the feed amount and the amplitude of the reciprocal vibration due the vibration unit calculated by dividing the amplitude by the feed amount, as an amplitude/feed ratio to the control section C1 via the numerical value setting section C2 or the like, the amplitude is set by multiplying the feed amount, which is set in a cutting work, by the amplitude/feed ratio.

The amplitude setting unit and the vibration unit cooperate with each other. As illustrated in FIG. 8C, the control section C1 controls the vibration unit so that the path of the cutting tool 130 in backward movement of the reciprocal vibration in the n+1th rotation of the workpiece W (n is an integer equal to or larger than one) reaches the path of the cutting tool 130 in the nth rotation of the workpiece W by setting the amplitude according to the reciprocal vibration of the cutting tool 130 along the feed direction under a condition based on the number of vibrations N and the number of rotations S set by the setting unit via correction of the number of rotations S and the number of vibrations N by the correcting unit and the feed amount set in a cutting work.

In other words, the control is executed so that the portion that is cut in forward movement overlaps the portion that is cut in backward movement.

This enables to set the amplitude in accordance with the feed amount for the condition of vibration corrected by the correcting unit, and the vibration unit can vibrate the cutting tool 130 under control of the control section C1 so that the air-cut can occur to segment chips.

In the machine tool 100 of the present embodiment, the number of rotations S, the number of vibrations N, and the amplitude/feed ratio can be set to the control section C1 by a user by entering a value of the number of rotations S, a value of the number of vibrations N, and a value of the amplitude/feed ratio via the numerical value setting section C2 as a parameter value. Alternatively, a value of the number of rotations S, a value of the number of vibrations N, and a value of the amplitude/feed ratio may be set by writing the values in a machining program, or a value of the number of vibrations N and the amplitude/feed ratio may be set in a program block (one line of a program) as an argument.

When the control section C1 is configured so that start of a vibration cutting work, in which the cutting tool 130 is fed in the feed direction while reciprocally vibrating along the feed direction, is instructed in a machining program with a command G* P0 as in the case of the present invention, a value of the amplitude/feed ratio set to the control section C1 can be specified in a value succeeding Q (argument Q) and a value of the number of vibrations set to the control section C1 can be specified in a value succeeding D (argument D) in the command G*.

If the amplitude/feed ratio is set to "1.5", then "Q1.5" should be written after G* in the machining program. If the number of vibrations is set to "3.5", then "D3.5" should be written after G* in the machining program. By doing so, the number of vibrations N and the amplitude/feed ratio can be set to the control section C1.

In the example illustrated in FIG. 9, the control section C1 is configured so that end of a vibration cutting work is instructed with a command G*** P0 in a machining program.

Accordingly, if the feed amount is set to "0.015" by using a value succeeding F (argument F) in a command written between the command G* P0 and the command G* P0, such as a command G1 that linearly moves the cutting tool 130, the amplitude setting unit reads the amplitude/feed ratio of 1.5 and calculates the amplitude with the formula 0.015× 1.5.

It is noted that display means such as a display device may be provided on the control device C that displays a cutting condition search screen so that a user can select and set a condition such as the feed amount, the number of rotations S, the number of vibrations N, the amplitude/feed ratio, and the vibration frequency from a predetermined table (database of vibration cutting conditions) by inputting material, circularity, surface roughness, or the like as a condition of a cutting work.

In the present embodiment, although the path of the cutting tool 130 in backward movement of the reciprocal vibration in the n+1th rotation (n is equal to or larger than one) of the workpiece W intersect the path of the cutting tool 130 in the nth rotation of the workpiece W under the control of the control section C1, as illustrated in FIG. 4 and FIGS. 8A to 8C, it is enough that the former path simply reaches the latter path without intersecting the latter path.

In other words, the overlapping of the portion that is cut in forward movement of the reciprocal vibration and the portion that is cut in backward movement of the reciprocal vibration includes the case where the portion that is cut in forward movement of the reciprocal vibration is in contact with the portion that is cut in backward movement of the reciprocal vibration.

When the portion that is cut in forward movement of the reciprocal vibration is in contact with the portion that is cut in backward movement of the reciprocal vibration, the portion that is cut with the cutting tool 130 in forward movement of the reciprocal vibration theoretically includes the portion that is cut in backward movement of the reciprocal vibration as a "point" in each vibration, and air-cut in which the cutting tool 130 moves away from the workpiece W in backward movement occurs at a "point". Therefore, chips generated from the workpiece W in a cutting work are sequentially segmented by the air-cut (at a point where the portion that is cut in forward movement of the reciprocal vibration is in contact with the portion that is cut in backward movement of the reciprocal vibration).

REFERENCE SIGNS LIST 100 machine tool
110 spindle
110A spindle headstock
120 chuck
130 cutting tool
130A cutting tool post
150 X-axis direction feeding mechanism
151 base
152 X-axis direction guide rail
153 X-axis direction feeding table
154 X-axis direction guide
155 linear servo motor
155a mover
155b stator
160 Z-axis direction feeding mechanism
161 base
162 Z-axis direction guide rail
163 Z-axis direction feeding table
164 Z-axis direction guide
165 linear servo motor
165a mover
165b stator
C control device
C1 control section
C2 numerical value setting section
W workpiece

The invention claimed is:

1. A machine tool comprising a workpiece holding unit for holding a workpiece, a tool post to hold a cutting tool for cutting a workpiece, a rotating unit for rotating the cutting tool and the workpiece relative to each other, a feeding unit for feeding the cutting tool and the workpiece in a predetermined feed direction, a vibration unit for reciprocally vibrating the cutting tool and the workpiece relative to each other, and a control device comprising a control section to make the machine tool machine the workpiece via the rotation of the cutting tool and the workpiece relative to each other and via the feeding of the cutting tool in the feed direction to the workpiece with the reciprocal vibration, wherein the control section determines a number of rotations of the workpiece and cutting tool relative to each other and a number of vibrations of the reciprocal vibration per rotation in the rotation of the workpiece and cutting tool relative to each other when the workpiece is machined in accordance with a vibration frequency dependent on a period in which an operating instruction can be executed.

2. The machine tool according to claim 1, wherein the vibration unit reciprocally vibrates the cutting tool and the workpiece relative to each other along the feed direction.

3. The machine tool according to claim 2, wherein the vibration unit reciprocally vibrates the cutting tool and the workpiece relative to each other so that a portion of the workpiece that is cut with the cutting tool in forward movement of the reciprocal vibration overlaps a portion of the workpiece that is cut with the cutting tool in backward movement of the reciprocal vibration.

4. The machine tool according to claim 1, wherein the control section utilizes the number of rotations, the number of vibrations, and the vibration frequency as parameters, sets a value of at least one of said parameters and sets each of the rest of said parameters to a predetermined value, and corrects the value of said at least one of the parameters on the basis of the predetermined value of each of the rest of said parameters.

5. The machine tool according to claim 4, wherein the control section sets each of the rest of said parameters to a predetermined value and corrects the value of said at least one of said parameters set by the control section so that the number of rotations will be inversely proportional to the number of vibrations with a constant that is based on the vibration frequency.

6. The machine tool according to claim 5, wherein the control section sets the number of rotations as a parameter, and sets the number of vibrations to a plurality of predetermined values, sets the vibration frequency to a predetermined value that the control device inherently has, and corrects the value of said number of rotations on the basis of each of the predetermined values of the number of vibrations and the value of the vibration frequency.

7. The machine tool according to claim 6, wherein the control section calculates and sets the number of rotations on the basis of a predetermined peripheral speed and a diameter of the workpiece.

8. The machine tool according to claim 6, wherein the control section corrects the value of said number of rotations on the basis of a table correlating the number of vibrations, the vibration frequency, and the number of rotations to a value of the number of rotations in the table, and enables machining of the workpiece with the corrected value of the number of rotations as well as values of the number of vibrations and the vibration frequency that correspond to the corrected value of the number of rotations in the table.

9. The machine tool according to claim 8, wherein the control section determines a value to which the number of rotations is corrected in descending order of values of the number of vibrations and in descending order of values of the vibration frequency in the table.

10. The machine tool according to claim 5, wherein the control section sets the number of rotations and the number of vibrations as parameters, and corrects the values of the number of rotations and the number of vibrations to values that are determined on the basis of the vibration frequency.

11. The machine tool according to claim 10, wherein the control section sets the number of vibrations as the number of rotations per vibration.

12. The machine tool according to claim 10, wherein the control section reads a number of vibrations written in a program block of a machining program of the machine tool as an argument and sets the read number of vibrations as the number of vibrations.

13. The machine tool according to claim 1, wherein the control section sets the amplitude of the reciprocal vibration proportionally to a feed amount of the cutting tool to the workpiece, and cooperates with the vibration unit so that a portion of the workpiece that is cut with the cutting tool in forward movement of the reciprocal vibration overlaps a portion of the workpiece that is cut with the cutting tool in backward movement of the reciprocal vibration.

14. The machine tool according to claim 13, wherein the control section reads a ratio of the amplitude to the feed amount written in a program block of a machining program of the machine tool as an argument and calculates and sets the amplitude on the basis of said ratio.

15. The machine tool according to claim 1, wherein the workpiece holding unit is a spindle for holding a workpiece, and wherein the machine tool comprises: a spindle moving mechanism to move said spindle holding the workpiece in an axial direction; and a tool post moving mechanism to move the tool post holding the cutting tool toward the spindle, and the feeding unit includes the spindle moving mechanism and the tool post moving mechanism and feeds the cutting tool to the workpiece via cooperation of the spindle moving mechanism and the tool post moving mechanism.

16. The machine tool according to claim 1, wherein the workpiece holding unit is a spindle for holding a workpiece and wherein said spindle holding the workpiece is fixed on the machine tool, the machine tool comprises a tool post moving mechanism to move the tool post holding the cutting tool in multiple directions, and the feeding unit includes the tool post moving mechanism and feeds the cutting tool to the workpiece by moving the tool post in a feed direction toward the spindle positioned in the feed direction.

17. The machine tool according to claim 1, the workpiece holding unit is a spindle for holding a workpiece, and wherein the tool post holding the cutting tool is fixed on the machine tool, the machine tool comprises a spindle moving mechanism to move said spindle holding the workpiece in multiple directions, and the feeding unit includes the spindle moving mechanism and feeds the cutting tool to the workpiece by moving the spindle in a feed direction toward the tool post positioned in the feed direction.

* * * * *